(12) United States Patent
Yang

(10) Patent No.: US 6,928,522 B2
(45) Date of Patent: Aug. 9, 2005

(54) UNBALANCED INCLUSIVE TAGS

(75) Inventor: Jaehyung Yang, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 241 days.

(21) Appl. No.: 10/337,607

(22) Filed: Jan. 7, 2003

(65) Prior Publication Data

US 2004/0133748 A1 Jul. 8, 2004

(51) Int. Cl.[7] ............................................. G06F 12/00
(52) U.S. Cl. ...................................... 711/144; 711/145
(58) Field of Search ................................. 711/144–146

(56) References Cited

U.S. PATENT DOCUMENTS 6,615,322 B2 * 9/2003 Arimilli et al. ............. 711/145

* cited by examiner

Primary Examiner—Matthew D. Anderson

(57) ABSTRACT

The disclosed embodiments may relate to cache memory systems. A multiprocessor computer system may include multiple processors and caches that may be organized in a hierarchical configuration. The caches may be organized into lines and include data and cache tags. Due to the limitations in the system architecture, the lower level caches may be limited in size, which may not be able to maintain the inclusion property. By including the unbalanced inclusion caches tags, a request for data within list from other components, such as other processors, may be handled without interacting with the upper level caches.

20 Claims, 5 Drawing Sheets

| A | B |
|---|---|
| E - PROCESSOR A - 172A | CACHE DATA - 172B |
| S - PROCESSOR A - 174A | CACHE DATA - 174B |
| I - PROCESSOR C - 176A | CACHE DATA - 176B |
| E - PROCESSOR A - 178A | CACHE DATA - 178B |
| E - PROCESSOR B - 180A | CACHE DATA - 180B |
| S - PROCESSOR C - 182A | CACHE DATA - 182B |
| S - PROCESSOR A - 184A | CACHE DATA - 184B |
| E - PROCESSOR B - 186A | CACHE DATA - 186B |

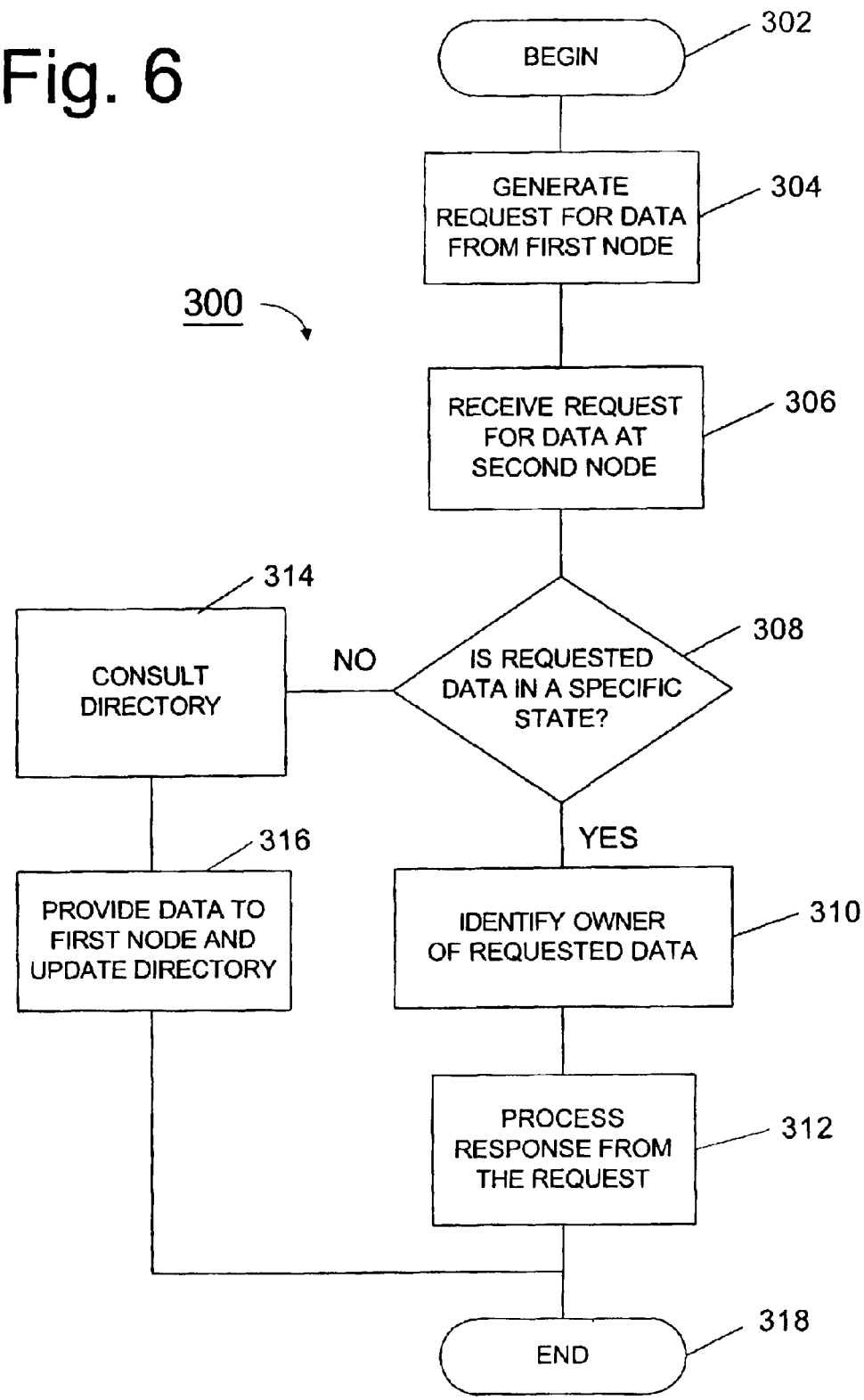

UNBALANCED INCLUSIVE TAGS

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing a gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

One of the most important advances in recent years is the development of multiprocessor computer systems. These powerful computers may have two, four, eight or even more individual processors. The processors may be given individual tasks to perform or they may cooperate to perform a single, large job.

In a multiprocessor computer system, processors may control specific processes. One of the processors may be designated to boot the operating system before the other processors are initialized to do useful work. Typically, the processor designated to boot the operating system is referred to as the bootstrap processor or BSP. The other processors in the system are typically designated application processors or APs. The system memory in a multiprocessing computer system may be connected to one of the processors, which may be referred to as a home processor or home node. Other processors may direct requests for data stored in the memory to the home node, which may retrieve the requested information from the system memory.

Each processor in the computer system may include a cache memory system, which may be integrated into the processor or external to the processor to enhance the performance. A cache memory may include the most recently accessed data or data sorted in a particular manner, which may be stored in a location to allow fast and easy access to the data. By saving this data in the cache memory system, execution time may be reduced and bottlenecks prevented by having data quickly accessible during the operation of a program or application. For instance, software programs may run in a relatively small loop in consecutive memory locations. To reduce execution time, the recently accessed lines of memory may be stored in the cache memory system to eliminate the time associated with retrieving the program from memory. Accordingly, as the speed of the system increases, the expense of the system may increase as well. Thus, in designing a cache memory system, organization, speed, and associated cost limitations may influence the configuration.

To organize the cache memory system, layers or levels may be utilized to enhance the performance of the system. For instance, in a three level cache system, a first level cache may maintain a certain amount of data and may be coupled to one of the microprocessors. A second level of cache may be connected to one or more first level caches and include the first level cache data along with other additional data. Finally, a third level cache may be connected to multiple second level caches and include the second level caches data along with other additional data. The higher levels of cache may include be designed for faster access, while the lower cache levels may be designed for slower access. The interconnectivity and complexity of the system dramatically increases with the added levels of cache, but may enable the system to operate more efficiently.

To provide an effective cache memory configuration, a cache memory system may include a large amount of dynamic random access memory ("DRAM") along with static random access memory ("SRAM"). As SRAM is capable of providing faster access, it may be utilized as a memory cache to store frequently accessed information and reduce access time for the computer system. In selecting the appropriate combination of SRAM and DRAM, the cost and speed of the different memories may be utilized to design the appropriate cache. SRAM may be more expensive, but may enable faster access to the data. While DRAM may be less expensive, it may provide slower access to the data. Accordingly, the structure of the cache system may be influenced by the access speed and cost factors.

In operation, the cache levels may be designed to increase in size from the highest level down to the lowest level for the cache memory system to provide benefits. For instance, if the first level cache is unable to supply the data (i.e. the cache misses), then the second level cache may be able to supply the data to the requestor. Likewise, if the second level is unable to supply the data, then the third level is accessed next. If none of the caches are able to supply the data, then the memory is accessed to retrieve the data. As discussed above, the intention of the cache levels is to provide the data with the caches, which are faster than accessing the memory. If the lower level caches are the same size or smaller than the upper level caches, then the lower level caches may not be able to include all of the information within the upper level caches and satisfy the inclusion principle. In addition, even if the lower level cache is larger than the upper level caches the inclusion property may not hold in some specific designs.

Under the inclusion principle, the lower levels of caches include the information within any upper level cache that it is connected to the lower level cache in addition to any other information. This allows the lower level cache to provide additional functionality to the system and enables the system to operate more efficiently. If lower levels of cache fail to follow the inclusion principle, problems or complications may arise with the cache coherency protocol because the lower levels do not include the upper level information. This may result in the lower level caches being unable to respond to requests or probes. For the second level cache to provide this enhanced functionality to the first level cache, the second level cache may be larger than the first level cache to be able include and maintain more data. Likewise, the same principle applies to the third level cache in providing increased functionality to the second level cache. This exponential increase in the cache size for the different levels increases the cost of the system, because the faster SRAM is more expensive than the slower DRAM. Thus, the number of cache levels and size of the cache levels may be adjusted along with the interaction between levels to design caches that optimize the various factors, such as cost, interconnectivity, and speed.

In addition to the access speed and cost factors, the system design may be influenced by the information to be provided by the system. In providing information, the cache memory system may have the cache divided into individual lines of data. The individual cache lines may include information that is unique to that cache line, such as cache data and associated cache tag information. Cache data may include information, instructions, or address information for the particular line of cache. Similarly, the cache tag may include information about the status of the cache line and the owner of the cache line. Based on the information provided in each of the lines, the cache memory system may be able to enhance the performance of memory system.

As another organizational factor, a cache memory system may include a cache controller to track the information within the cache memory. In operation, the cache controller may respond to requests from processors, thus reducing the wait time experienced in the system. The cache controller may be utilized to control the flow of data or information within a cache memory system. For instance, a request for data may be received by the cache controller, which may review the request to determine the appropriate action. If the cache controller determines that the information is within the cache, it may respond to the requestor without any wait time being incurred. However, if the cache controller does not have the information, then the information may be accessed from other memory, which will likely increase the wait time. Accordingly, the cache controller may be able to manage the information within the memory better to increase performance.

To operate properly with a cache controller, the cache memory subsystem should maintain the latest updated information to insure that the cache includes the most recent data and is consistent between the multiple caches and microprocessors. The maintenance of the data within the cache may be referred to as cache consistency or coherency. Data integrate may be compromised if the copy of the line in the cache no longer matches the data stored in memory. Various techniques may be used to identify and control the individual lines of the cache. In a multiprocessor computer system, several cache subsystems may exist, which further complicates the complexity of maintaining the various caches.

With complex multiprocessor systems, a directory or snoop protocol may be utilized to control the flow of information and ensure that the consistency of the cache is maintained. For instance, in a directory-based system, the directory may act as a central controller that tracks and maintains the various lines of cache within a system. With a directory, various subsystems communicate to the directory, which manages the cache memory for the system and maintains the cache coherency protocol. A cache consistency model may be used to handle the complexity of the multi-processing environment and enable the directory to manage the caches.

For instance, a status model, such as the MESI cache consistency model, may provide a method for tracking the states of information in each cache line. Under the MESI cache consistency model, four states may exist for a cache line, such as modified, exclusive, shared, and invalid. The modified state may indicate that the cache line has been updated and may alert other systems to write the modified line to memory. The exclusive state may indicate that the cache is not available at other caches. The shared state may indicate that the copies of the cache line are also located in other caches, while the invalid state may indicate that the data in the cache line is not present, uncached, or invalid. These states may be used in handling the requests for cache lines.

Under the MESI model, each processor may maintain a list of cache information in a cache list, which may include the state and owner of the cache line. In maintaining this cache list, the coherency protocol may be utilized to control the flow of information within the system. For the list to be properly maintained, the directory is consulted with each communication or request related to the cache lines. This allows the directory to maintain the caches with the most recent and correct data.

However, the problem with this design is that size of the lower level caches may be limited in size by cost factors. If the lower level caches are limited in size, the lower caches may not be able to include the upper level caches in addition other data. Accordingly, the cache inclusion property for these caches fails to be applied. If the cache inclusion property does not hold for lower levels caches, any requests or probes may have to be forwarded to upper level caches. In this situation, a processor associated with the cache may have to compete with probes or other requests for the cache and bus time. Thus, with the processor having to compete for bus and cache access, the efficiency of the system may be reduced and coherency latency may increase.

BRIEF DESCRIPTION OF THE DRAWINGS

Advantages of the disclosed embodiments may become apparent upon reading the following detailed description and upon reference to the drawings in which:

FIG. 6 is a process flow diagram in accordance with embodiments of the present invention.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

With multi-level cache system, various levels of caches may be utilized to improve performance of the multiprocessor system. For the multi-level cache system to enhance performance, the lower level caches should include the upper level cache information. The cache coherency may be maintained while the size of the lower level caches may be reduced costs. By reducing the size of the lower level caches, the embodiment be able to reduce cost of the system, while maintaining the cache coherency.

For instance, while not limited in any way to such applications, the disclosed embodiments may enable a multi level cache system to operate in a more efficient manner. By having a lower level cache that includes upper level cache tags for data that is in a particular state, such as the exclusive or shared states. Even thought the lower level cache may not be able to include all the cache lines of the upper level caches, by including the upper level cache tags for data in a particular state in the lower level cache, the inclusion property may be enforced. By including these unbalanced inclusive cache tags, the lower level cache may be reduced along with latency associated with memory accesses. Thus, the disclosed embodiments may be able to enhance the systems performance, while reducing the associated cost.

Figure 1:
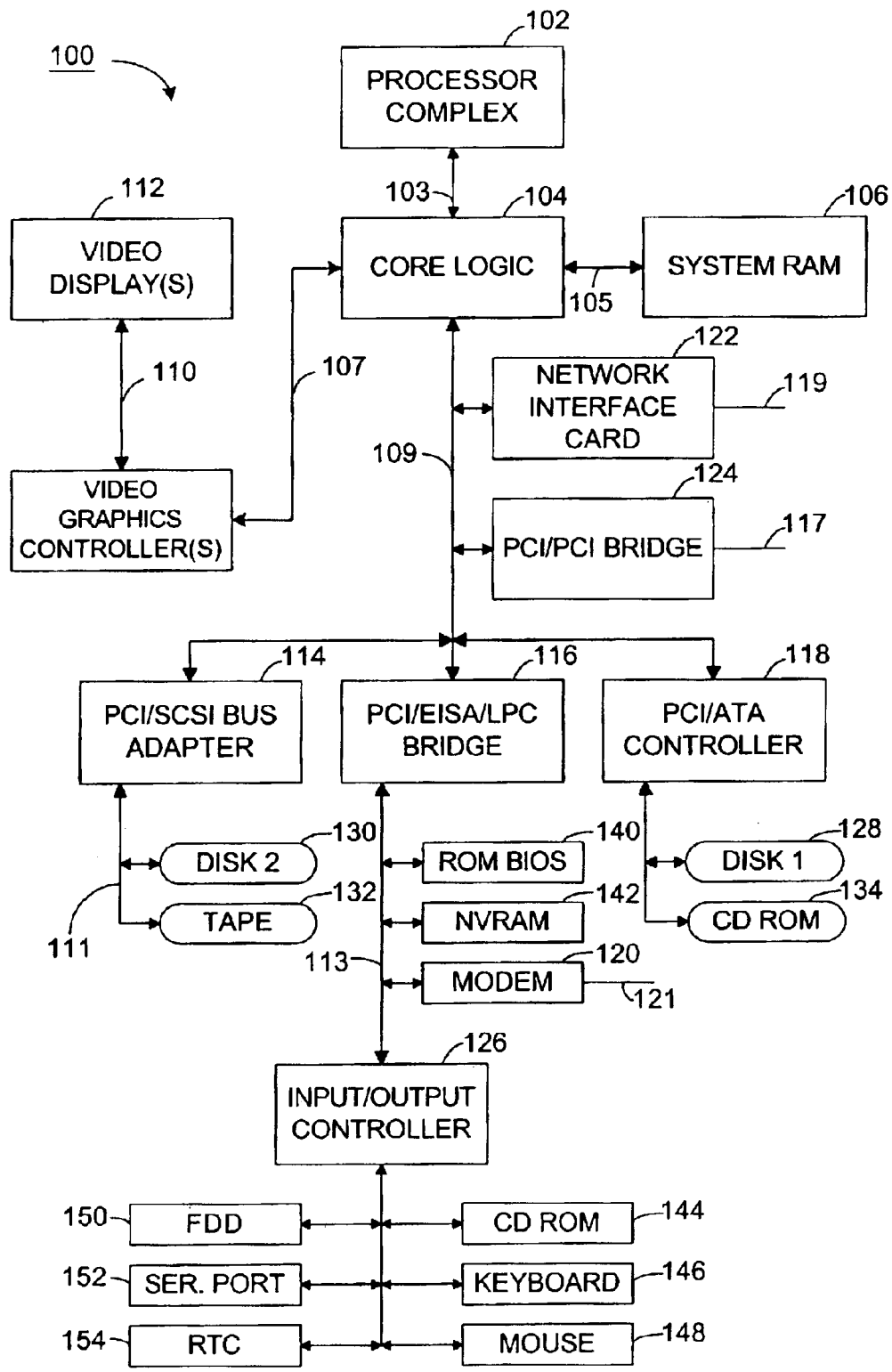
FIG. 1 is a block diagram illustrating an exemplary multiprocessor computer system in accordance with embodiments of the present invention.

Referring now to FIG. 1, a schematic block diagram of an exemplary multiprocessor computer system utilizing an embodiment of the present invention is illustrated. A computer system is generally indicated by the numeral 100 and may comprise a processor complex 102 (which includes a plurality of central processing units ("CPUs")). Also included in the computer system 100 may be core logic 104 (or north bridge), system random access memory ("RAM") 106, a video graphics controller(s) 110, a video display(s) 112, a PCI/SCSI bus adapter 114, a PCI/EISA/LPC bridge 116, and a PCI/ATA controller 118. Single or multilevel cache memory (not illustrated) may also be included in the computer system 100, along with memory being dedicated each of the processors that may be in the processor complex 102. The processor complex 102 may be arranged in a symmetric or asymmetric multi-processor configuration.

In the operation of a multiprocessor computer system, one of the processors that comprise the processor complex 102 may be designated as the bootstrap processor (BSP) by the system BIOS shortly after the computer system is first powered on. The BSP executes the system power-on self test ("POST") while the other processors (the application processors or APs) remain in a sleeping or quiescent state. After executing the POST, the BSP boots the operating system, which subsequently assigns tasks to the APs.

The processor complex 102 may be connected to the core logic 104 through a host bus 103. The system RAM 106 may be connected to the core logic 104 through a memory bus 105. The video graphics controller(s) 110 may be connected to the core logic 104 through an AGP bus 107 (or other bus for transporting video data). The PCI/SCSI bus adapter 114, PCI/EISA/LPC bridge 116, and PCI/ATA controller 118 may be connected to the core logic 104 through a primary bus 109. The primary bus 109 may be a PCI bus, a PCI-X bus an Infiniband bus or any other suitable data transport construct. For illustrative purposes only, the primary bus 109 will be referred to as a PCI bus herein, although other protocols are suitable as well.

A network interface card ("NIC") 122 and a PCI/PCI bridge 124 may also be connected to the PCI bus 109. Some of the devices on the PCI bus 109, such as the NIC 122 and PCI/PCI bridge 124 may plug into connectors on the computer system 100 motherboard (not illustrated). The PCI/PCI bridge 124 may provide an additional PCI bus 117.

A hard disk 130 and a tape drive 132 may be connected to the PCI/SCSI bus adapter 114 through a SCSI bus 111. The NIC 122 may be connected to a local area network 119. The PCI/EISA/LPC bridge 116 may connect over an EISA/LPC bus 113 to a non-volatile random access memory (NVRAM) 142, modem 120, and/or an input-output controller 126. The NVRAM 142 may store the system BIOS and/or other programming and may include flash memory. Additionally, the NVRAM may be contained in a programmable logic array ("PAL") or any other type of programmable non-volatile storage. The modem 120 may connect to a telephone line 121. The input-output controller 126 may interface with a keyboard 146, a CD-ROM drive 144, a mouse 148, floppy disk drive ("FDD") 150, serial/parallel ports 152, and/or a real time clock ("RTC") 154.

Figures 2, 3:
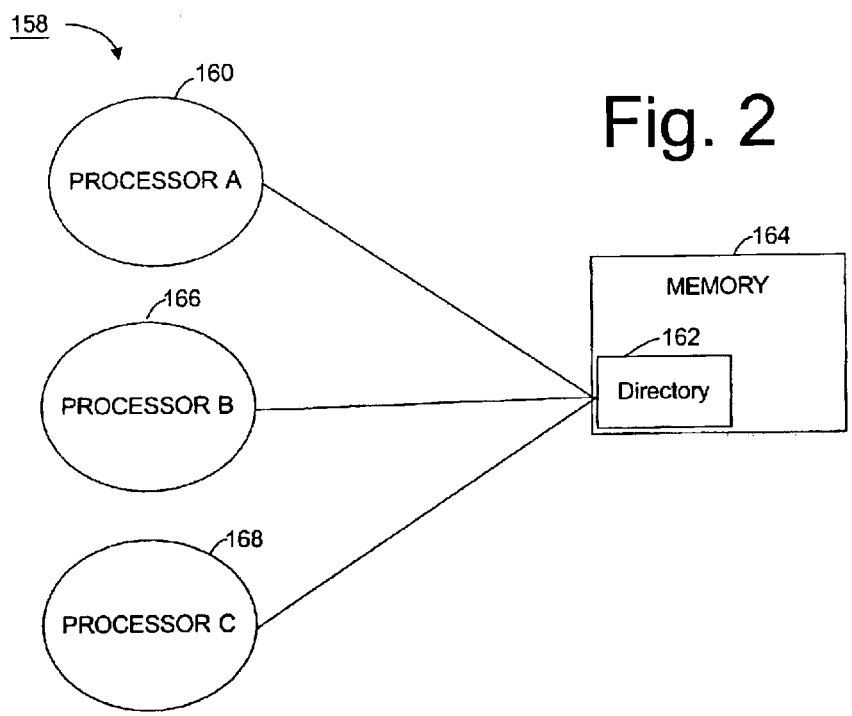
FIG. 2 is a block diagram illustrating a simplified multiprocessor computer system in accordance with embodiments of the present invention.
FIG. 3 is a block diagram of a cache in accordance with embodiments of the present invention.

Referring generally to FIG. 2, a block diagram is shown that illustrates a simplified multiprocessor computer system in accordance with embodiments of the present invention. In this block diagram 158, the multiprocessor complex 102 of FIG. 1 may include multi-processors that communicate to maintain a cache, which may include the most recently accessed information or information that is within a contiguous memory block. To maintain the cache, the processors may interact with a memory array or a directory 162, which may act as the central control point for the cache management, of the system. The directory 162 may be within a memory block 164 and may connect to a processor A 160, a processor B 166, and a processor C 168, which may be nodes that include cache controllers, caches, and other components. The function of the directory 162 may be to store status tags and ownership information of cache lines or memory locations and to manage and maintain cache coherency. As one specific function, the directory 162 may control the flow of information between the processors, such as processor A 160, processor B 166, and processor C 168. In maintaining the coherency of the cache, the directory 162 may utilize a cache coherency model, such as the MESI model, to control the cache size and associated transactions between nodes or processors 160, 166, and 168, which may be interconnected via a links or buses. In operation, these processors 160, 166, and 168 may send requests to the directory 162 for certain cache lines of data. However, depending on the state of the data, the response paths for various transactions may be increased because the cache line requested is in the exclusive state and owned by a remote node.

While the present embodiment of the directory 162 may be utilized as central control for the cache coherency, the directory 162 may be distributed into multiple components in a snoop-based system. For instance, the directory 162 may be a plurality of collection of status tags and associated information regarding the specific data. This plurality of collection of status tags may be located in or adjacent to a coherency filter for use in a snoop based cache coherency system. Also, the plurality of collection of status tags may be associated with each memory that may be distributed throughout the system.

As an example of an extended transaction path, the processor B 166 may make a request for data from memory. This request is delivered to the directory 162 and then may be further directed to the memory 164. The directory 162 may place the cache line into the exclusive state. If the memory data is in the exclusive state, that data may not be known by any other cache in the system. In this case, the status of the requested data may be controlled by processor B 166, which may be an owning node or processor. If processor C 168 requests a copy of the same data, then another request may be sent to the directory 162. If the cache line is in the exclusive state, the directory 162 may send a probe or a request for the status of the cache line to processor B 166. The processor B 166 may send a status update and/or data to directory 162, which may be forwarded to the processor C 168, or directly to processor C 168. Each of the various steps consumes time and adds latency by creating longer response paths, increasing coherency traffic, and increasing the effective memory latency.

In a multiprocessor system, caches may be utilized to store information that is being requested and to improve performance. Referring to FIG. 3, a block diagram of a cache in accordance with embodiments of the present invention is illustrated. In the block diagram, a cache 170 may include multiple cache lines 172–186, which each may include cache tags 172A–186A and cache data 172B–186B, respectively. As discussed above, requests may be communicated within the system to carry out instructions or perform specific operations from information provide in the cache. The cache lines 172–186 may include data components or information that enables the system to operate more efficiently. Specifically, cache tags 172A–186A may include tag information that relates to the status of the information within the cache lines 172–186.

To maintain coherency of the cache during operation, the cache tags may be assigned states via each of the cache tags 172A–186A. These states may correspond to a cache coherency model, such as the MESI model states. The MESI model may provide states, such as exclusive, shared, or invalid. This may enable the system to verify if the data within the respective cache lines 172–186 is valid or accessible. Cache data 172B–186B may be associated with the cache tags 172A–186A for each of the cache lines 172–186. The cache data 172B–186B may include instructions, recently accessed data, or a pre-loaded program code, for instance. The cache tags 172A–186A and cache data 172B–186B may be utilized independently or jointly to provide information in response to a request to operate the system more efficiently.

For example, the cache line 174 may include cache tag 174A and cache data 174B. In this cache line 174, the cache data 174B may be shared from processor A, which means that multiple copies of the data may exist in various other caches within the system. Similarly, the cache line 172 may include cache tag 172A and cache data 172B. In this cache line 172, the cache data 172B may be exclusive data that is owned by processor A. Thus, no other cache may have the recent version of the data and processor A controls any updates of the data. In addition, as processor A has the most recent version of the data, any request for this data should be directed to processor A.

Furthermore, to improve performance of a system utilizing caches, the organization of the caches may utilize the locality principle. The locality principle relates to the placement of data within the cache or memory. As systems may operate in different manners, the locality principle may be broken into temporal locality and spatial locality. Temporal locality may be based on the principle that the same instructions may be fetched frequently and continuously, which means that programs tend to use the recently accessed instructions repeatedly from cache. Under this principle, caches that retain recently accessed instructions may optimize the operation of the system by reducing wait time for instructions to be retrieved from memory. Alternatively, spatial locality may be based on the principle that programs utilize data that is located in a close proximity to each other. Under this principle, the instructions may be pre-loaded into the cache because it is likely that they will be utilized in the execution of the program. By preloading the data into the cache, the system may reduce the associated wait time for the program to access the appropriate data. Accordingly, the operation of the cache may influence its design.

Figure 4:
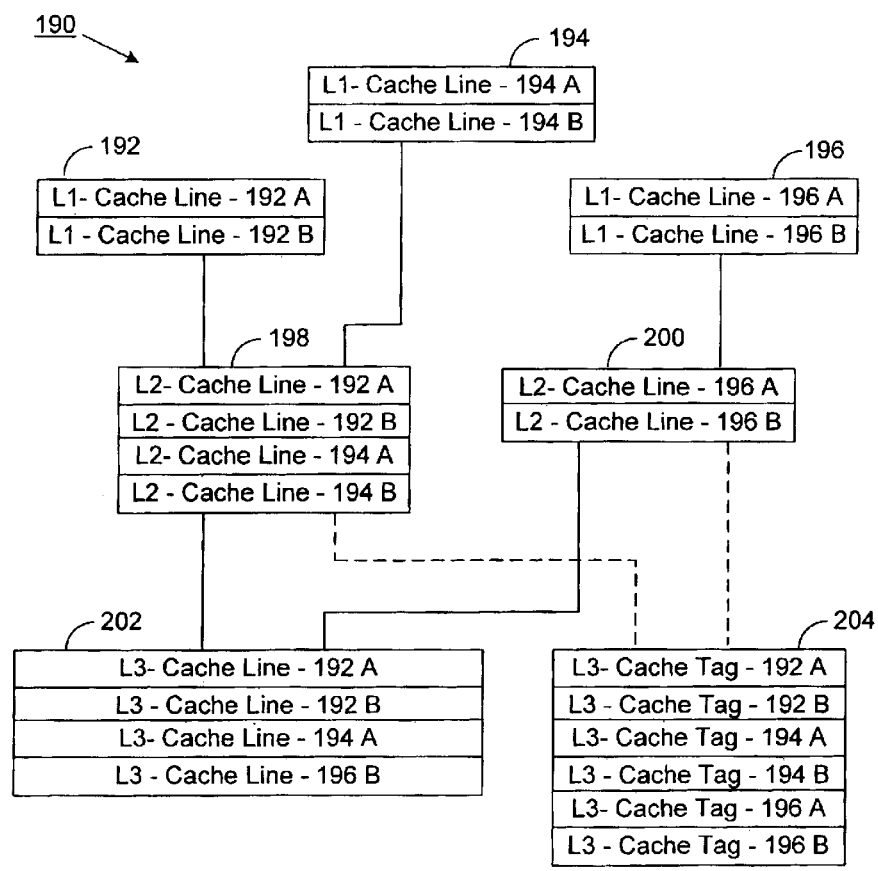
FIG. 4 is a block diagram of a multi-level cache in accordance with embodiments of the present invention.

In a multiprocessor system, caches may be utilized to store the information that is being requested. Referring to FIG. 4, a block diagram of a multi-level cache structure in accordance with embodiments of the present invention is illustrated. In this embodiment of a multi-level cache system 190, the caches may be divided into a general hierarchical structure. In this structure, a first level cache may be the highest level, while being the smallest cache size. A second level cache may be the medium level cache that is larger than the first level cache. Finally, a third level cache may be a lower level cache than the second level cache that is larger than the second level cache.

In the multi-level cache system 190, the first level cache may be the fastest and smallest cache, which may be internal or external to the processor. The first level cache may be included within the circuitry of the processor to be able to respond and interact with the processor at the processor's own speed. In this embodiment, three first level ("1L") caches 192, 194, and 196 may be connected to the processors 160, 166, and 168, respectively. Each of the 1L caches 192, 194, and 196 may include two cache lines of data. These cache lines may include cache data along with cache tags, as discussed above with regard to FIG. 3.

To share the cache information with other systems, the 1L caches 192, 194, and 196 may be interconnected with second level ("2L") caches 198 and 200. The first 1L cache 192 and the second 1L cache 194 may connect to a first 2L cache 198. Under the inclusion principle discussed above, the first 2L cache 198 may include the cache lines of the first and second 1L caches 192 and 194 to provide enhanced functionality that increases the efficiency of the system. Similarly, the second 2L cache 200 may be connected to third 1L cache 196. Accordingly, the second 2L cache 200 may include the cache lines within the 1L cache 196. Thus, the 2L caches 198 and 200 are interconnected 1L caches 192, 194, and 196 and include the information within the respective caches.

As another interconnection for the multi-level cache system 190, the third level ("3L") cache 202 may be connected to the 2L caches 198 and 200. The 3L cache 202 may include all of the information within the 2L caches 198 and 200 along with other additional data. By including the information of the 2L caches 198 and 200, the 3L cache 202 may become quite large and costly. Under the inclusion principle, the 3L cache 202 may be as large as all of the 2L caches that it connects to in addition to any other data that it is designed to include. The lower level cache may be designed in a manner that fails to include all the upper level cache information, such as a non-inclusive cache system. In a non-inclusive multi-level cache system, a lower level cache may not resolve a request or probe regardless of the tag lookup outcome. The request may be forwarded to upper level caches, which satisfy the inclusion property to maintain cache coherency. Because the request has to be forwarded to upper level caches, the processor may have to compete with a probe for the cache and bus time. This increased competition for bus and cache access may reduce the efficiency of the system and may increase effective response latency for a request from the processor. Furthermore, because the snoop or probe may have to access upper level caches to resolve the coherency, the addition response path may increase the coherency latency for request from other remote processors.

To resolve the problems encountered, an unbalanced inclusive cache tag may be used as the 3L cache tags 204. Under this example, the unbalanced inclusive cache tag may include cache tag information for the cache lines included in the upper level caches, such as 2L caches 198 and 200 in the present embodiment. While cache 202 may not include all of the cache lines of the upper level caches 198 and 200, by utilizing the unbalanced inclusive cache tags in the 3L cache 204, the inclusion property may be maintained at the third cache level. This may enhance the performance of the system as described before.

Advantageously, the 3L cache tags 204 may reduce unnecessary traffic within the multi-level cache system. For instance, by including cache tags, any request that is related to one of the cache lines included in the higher level caches may be handled by the 3L cache tags 204. This reduces the complexity of the cache coherency while maintaining the cache within the design limitations. Further, traffic, such as snoops or probes, may be handled by the 3L cache tags 204, which allows the response path to be shortened. These enhancements may allow the system to operate more efficiently at a reduced cost. Thus, the present embodiment may enable the system to overcome the complications and inefficiency of cache coherency protocol due to cache size limitations or non-inclusive cache configurations.

Figure 5:
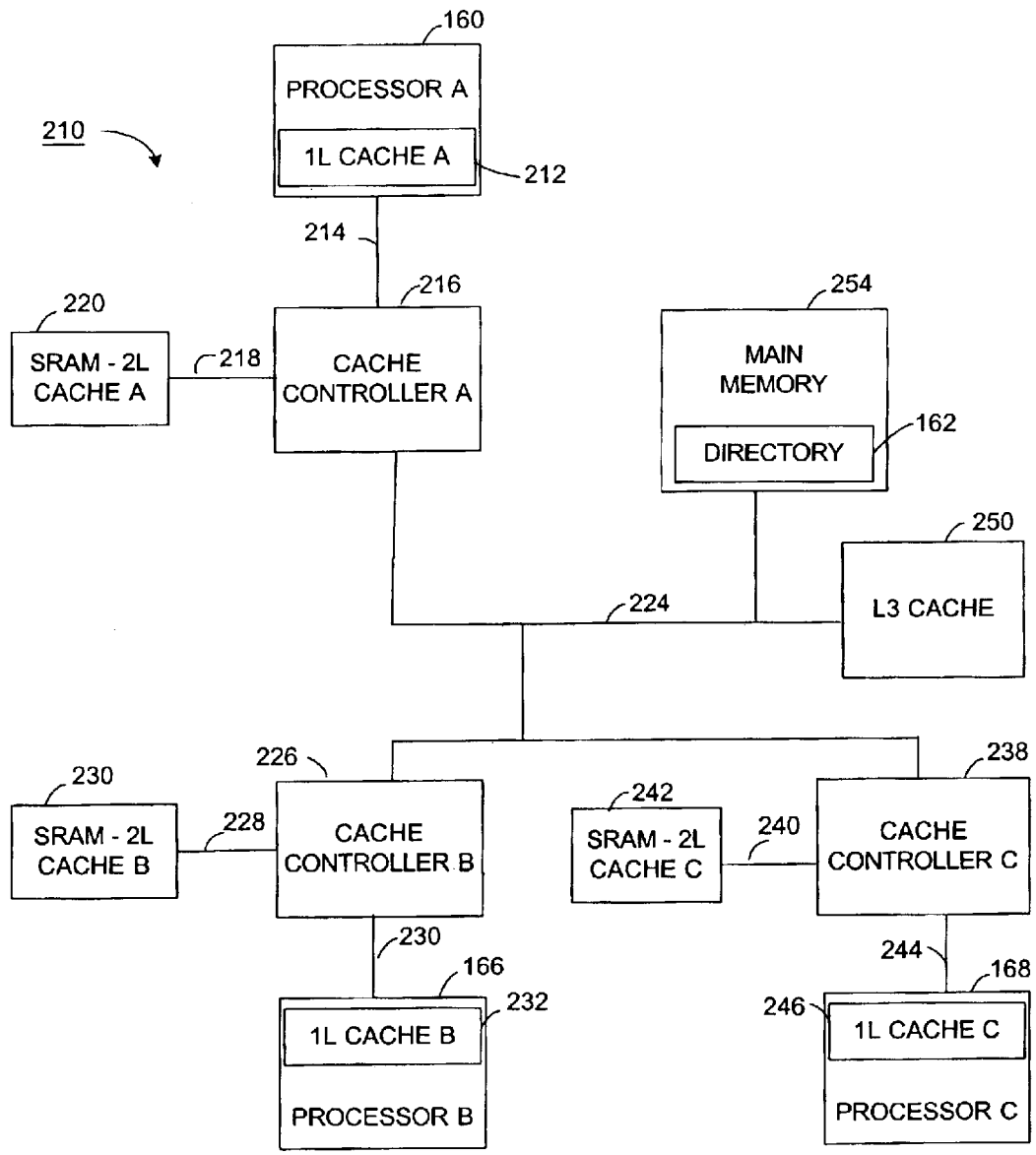
FIG. 5 is a block diagram of a multiprocessor subsystem in accordance with embodiments of the present invention.

To optimize the operation of the system and maintain the benefits of the cache levels, a schematic block diagram of a multiprocessor subsystem according to embodiments of the present invention is illustrated in FIG. 5. In a multiprocessor system 210, the multi-level cache system 190 may be utilized in a variety of different functions, such as to store information that has recently been accessed or to store cache line states as discussed above. In the embodiment, the multiprocessor system 210 may include three processors. However, it should be appreciated by those skilled in the art that the number and configuration of the processors may vary depending on more specific designs.

The first processor may be processor A 160, which may include a first level ("1L") cache A 212. The 1L cache A 212 may be internal to the processor A 160 to enable the cache to operate at near processor speeds. The 1L cache A 212 may include information, such as instructions or operations as discussed above. The processor A 160 and the 1L cache A 212 may be connected to a cache controller A 216 via a bus 214. The cache controller A 216 may be a logic component or circuitry that may perform the operations of reading, writing, or maintaining memory locations that it is requested to supply.

To interact with the associated memory, the cache controller A 216 may be connected to an SRAM 2L cache A 220 via a bus 218. The SRAM 2L cache A 220 may be the location that the cache controller A 216 maintains the most frequently accessed cache information or preloaded data because the wait time for SRAM is minimal relative to DRAM. The SRAM 2L cache A 220 may be a second level ("2L") cache that is internal to the processor 160 or external to the processor 160, depending on the specific design of the system. The SRAM 2L cache A 220 may be larger than the 1L cache A 212 to provide the functionality and satisfy the inclusion property as discussed above.

In addition to the connections to the memories 212 and 220, the cache controller A 216 may be connected to a cache controller B 226, cache controller C 238, main memory 254, and a third level ("L3") cache 250 via a bus 224. Although the cache controllers 226 and 238 may function in a similar manner as the cache controller A 216 described above, the cache controllers 226 and 238 may handle the functions for the processor B 166 and processor C 168, respectively. The cache controller B 226 may be connected to an SRAM 2L cache B 230 via a bus 228 along with a first level cache B 232 and the processor B 166 via a bus 236. Similarly, the cache controller C 238 may be connected to an SRAM 2L cache C 242 via a bus 240 along with a first level ("1L") cache C 246 and the processor C 168 via a bus 230.

To further enhance the systems performance, the 3L cache 250 may function as the interconnection between the main memory 254 and the cache controllers 216, 226, and 236. The cache 250 communicates with the main memory 254 and cache controllers 216, 226, and 236 via a bus 224. The 3L cache 250 may be located adjacent to the main memory 254 or may include multiple 3L caches that are adjacent to each of the cache controllers 216, 226, and 236. To provide a faster response, the 3L cache 250 may be SRAM, while the main memory 254 may be DRAM. By having the 3L cache 250 interact with the main memory 254, the system may be able to access the faster 3L cache 250 before the slower main memory 254 may be accessed to respond to a request. This configuration may enable the system to perform faster by reducing memory latency.

To reduce the effective memory latency, each of the caches may include various amounts of SRAM with the lower levels being larger than the upper levels to satisfy the inclusion principle. However, with the limitations associated with increasing size of the caches, the lower level caches may be non-inclusive caches in view of the design limitations. To overcome this problem, under the present example, the lower level cache may include unbalanced inclusive cache tags, which include the cache tags of the upper level caches, to maintain the inclusion property. By having unbalanced inclusive cache tags in the lower level caches, the size of each of the lower level cache may be reduced along with probe traffic.

In one embodiment, the 3L cache 250 may include exclusive cache tag states. By only having exclusive cache tag states, the 3L cache 250 may be small, while being able to simplify the operation of the system 210 by reducing the probe traffic. For instance, a request may be received by the 3L cache 250. If the requested data is in the exclusive state, then the 3L cache 250 may respond to the request without accessing the second level caches 220, 230, and 242 and first level caches 212, 232, and 246. By preventing the traffic and access to the upper level caches, the 3L cache may be increase performance within the system 210. Thus, by monitoring the "exclusive" state of the cache lines and redirecting traffic, the 3L cache 250 may be able to reduce the response path associated with the request, to maintain the coherency of the cache, and to reduce the effective memory latency.

As an alternative embodiment, the 3L cache 250 may include exclusive and shared cache lines from the upper level caches. By having exclusive and shared cache tag states, the 3L cache 250 may be smaller by including the cache tag information, while being able to simplify the operation of the system by reducing the probe traffic within the system 210 along with reducing the latency associated with invalidation acknowledgements. For instance, a request may be received within the system by the 3L cache 250. If the requested data is in the exclusive state, then the 3L cache 250 may respond to the request without accessing the second level caches 220, 230, and 242 and first level caches 212, 232, and 246. By preventing the traffic and access to the upper level caches, the 3L cache may be increase performance within the system 210. Similarly, if the requested data is in the shared state, then the 3L cache 250 may handle the request, which may reduce latency for invalidation acknowledgement. However, for the 3L cache 250 to operate properly with shared cache lines, the tag updates may be more frequent. Accordingly, by monitoring the exclusive and shared states of the cache lines, the 3L cache 250 may be able to reduce the response path associated with the request, to maintain the coherency of the cache, and to reduce the effective memory latency.

In addition, the design may be influenced by other factors as well. For instance, the second level caches may be located within the processor and each of the cache controllers may include a third level cache. This may further simplify the operation by reducing the probe traffic within the system 210. Likewise, the location of the 3L cache may be closer to a specific cache controller or other component to reduce the transaction path for that component. With the 3L cache 250 being located near the 3L cache 250 may provide the largest impact to the reduction of directory lookups. However, the 3L cache 250 may be located near or adjacent to the remote nodes to reduce the number of hops for specific requests or transactions. Accordingly, the selection of either location may be a design choice that enables the system to operate in a more efficient manner.

Turning to FIG. 6, a flow diagram is illustrated in accordance with embodiments of the present invention. In the diagram, generally referred to by reference numeral 260, the interactions between the various components discussed above are shown. The process begins at block 262. At block 264, a request for data may be generated from a first node or processor. The request may be for a specific line of cache that includes an instruction, recently accessed data, or operations. For instance, the data request may be from a node or processor, as discussed above with regard to FIGS. 2–5. The request may be received at a second node, as shown at block 266. The second node may be one of the third level caches discussed in FIG. 4 or 5.

Once the request is received, the request is examined (block 268) to determine if information is included in a list at the second node. The list may include the cache tag information for the various levels of cache or include specific cache tag states. If the second node does not have the requested data, then the information may be forwarded to a third node as shown in block 270. The third node may be the main memory or another node depending on the request. However, if the second node has the requested data within its list, then the request may be further processed in an upper level cache or main memory as shown at block 272. For instance, if the unbalanced inclusion tag is operating in the exclusive mode, then a match in the second node means that an exclusive copy exists in the upper level caches. Once the request is processed, the second node may respond to the request in block 274. For instance, the response to the request may include sending a response to the first node or forwarding information based on the request to other components. As another example, if the request is a probe, then the response may be to send a reply back to the requesting node or to a directory, which may include the data. Accordingly, the process ends at block 276.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A cache system for use in a computer system having a plurality of nodes, the cache system comprising:

a first cache associated with one of the plurality of nodes, the first cache storing a plurality of cache lines that each comprise a cache tag and corresponding data, the cache tag comprising state information; and a second cache associated with the first cache, the second cache being adapted to:
   store cache tags without the corresponding data from the first cache if the state information is indicative of at least one predetermined state;
   receive requests for data from one of the plurality of nodes;
   determine if requested data corresponds to any of the cache tags stored in the second cache; and
   respond to requests for data based on the state information contained in a cache tag associated with the requested data.

2. The system set forth in claim 1, wherein each of the plurality of nodes comprises a plurality of processors.

3. The system set forth in claim 1, wherein a collection of status tags is associated with one of the plurality of nodes, the collection of status tags being adapted to manage a cache coherency of the system.

4. The system set forth in claim 1, wherein the at least one predetermined state comprises an exclusive state or a shared state.

5. The system set forth in claim 1, wherein the second cache provides a response based on the state of the requested data without accessing the first cache.

6. The system set forth in claim 1, wherein the second cache determines whether the data requested by one of the plurality of nodes is in a shared state.

7. A computer system, comprising:

a plurality of processors that are adapted to execute commands and control the operation of the computer system;

a first cache associated with one of the plurality of processors, the first cache storing a plurality of cache lines that each comprise a cache tag and corresponding data, the cache tag comprising state information;

a second cache associated with the first cache, the second cache being adapted to:
   store cache tags without the corresponding data from the first cache if the state information is indicative of at least one predetermined state;
   receive requests for data from one of the plurality of nodes;
   determine if requested data corresponds to any of the cache tags stored in the second cache; and
   respond to requests for data based on the state information contained in a cache tag associated with the requested data;

a hard drive adapted to store data, including commands for use by at least one of the plurality of processors; and a system memory adapted to store data for use by at least one of the plurality of processors.

8. The system set forth in claim 7, wherein a collection of status tags is associated with one of the plurality of processors, the collection of status tags being adapted to manage a cache coherency of the system.

9. The system set forth in claim 7, wherein the at least one predetermined state comprises an exclusive state or a shared state.

10. The system set forth in claim 7, wherein the second cache provides a response based on the state of the requested data without accessing the first cache.

11. The system set forth in claim 7, wherein the second cache determines whether the data requested by one of the plurality of nodes is in a shared state.

12. A method of operating a cache system, the method comprising:

storing a cache tag without corresponding data from a first cache in a second cache based on state information of the cache tag;

receiving a request for data from a first node at the second cache;

determining if the requested data corresponds to the cache tag; and processing the request based on the state information by at least one of (i) transmitting a response to the first cache, (ii) forwarding the request to a second node depending on the cache tag, and (iii) generating a response to the first node.

13. The method set forth in claim 12, comprising representing cache data in an exclusive state with the at least one cache tag.

14. The method set forth in claim 12, comprising determining whether the data requested is in an exclusive state.

15. The method set forth in claim 12, comprising representing cache data in a shared state with the at least one cache tag.

16. The method set forth in claim 12, comprising determining whether the data requested is in a shared state.

17. A cache tag system for use in a computer system having a plurality of nodes, the cache tag system comprising:

means for storing cache data for each of a plurality of components of data, the means for storing being associated with a first one of the plurality of nodes;

means for storing cache tag information without the cache data from the means for storing cache data depending on state information, the means for storing cache tag information being associated with the first one of the plurality of nodes;

means for determining if requested data is available from the first one of the plurality of nodes or from another one of the plurality of nodes within the means for storing cache tag information depending on the state information; and means for processing a request for data based on whether the state information contained in a cache tag associated with the requested data indicates that the requested data is available from the first one of the plurality of nudes or from a different one of the plurality of nodes.

18. The system set forth in claim 17, wherein each of the plurality of nodes comprises a plurality of processors.

19. The system set forth in claim 17, wherein the means for storing cache tag information comprises a cache.

20. The system set forth in claim 17, wherein the cache tag system is a snoop based system.

* * * * *